United States Patent
Allen et al.

(10) Patent No.: US 10,430,713 B2
(45) Date of Patent: *Oct. 1, 2019

(54) PREDICTING AND ENHANCING DOCUMENT INGESTION TIME

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

This patent is subject to a terminal disclaimer.

(21) Appl. No.: 14/868,608

(22) Filed: Sep. 29, 2015

(65) Prior Publication Data

US 2016/0019462 A1 Jan. 21, 2016

Related U.S. Application Data

(63) Continuation of application No. 14/266,959, filed on May 1, 2014, now Pat. No. 9,563,846.

(51) Int. Cl.
*G06N 5/04* (2006.01)
*G06N 20/00* (2019.01)
(Continued)

(52) U.S. Cl.
CPC ......... *G06N 5/04* (2013.01); *G06F 16/24522* (2019.01); *G06F 16/3329* (2019.01);
(Continued)

(58) Field of Classification Search
CPC .......... G06N 5/04; G06N 20/00; G06N 7/005; G06N 5/025; G06F 16/90332;
(Continued)

(56) References Cited

U.S. PATENT DOCUMENTS 8,010,524 B2   8/2011  Chen et al.
8,275,762 B2   9/2012  Gupta et al.
(Continued)

FOREIGN PATENT DOCUMENTS

WO   WO009523373 A1   8/1995
WO   WO2010026391 A1   3/2010
WO   WO2011/038021 A1  3/2011

OTHER PUBLICATIONS

IBM reseacrh Report Artist Ranking through Analysis of Online Community Comments—20008 Grace et al. (Year: 2008).*

(Continued)

*Primary Examiner* — Kakali Chaki
*Assistant Examiner* — Ababacar Seck
(74) *Attorney, Agent, or Firm* — Stephen R. Tkacs; Stephen J. Walder, Jr.; Diana R. Gerhardt (57) ABSTRACT

A mechanism is provided in a data processing system for predicting and enhancing ingestion time for a set of input documents. The mechanism receives a set of documents to be added to a corpus of the data processing system. The mechanism records document features of each document within the set of documents using an annotation engine within the data processing system. The mechanism predicts an ingestion time for each document within the set of documents based on the document characteristics and a machine learning model. The mechanism assigns the set of documents to data processing system resources to be processed based on the predicted ingestion time for each document.

12 Claims, 5 Drawing Sheets

(51) Int. Cl.
*G06F 16/951* (2019.01)
*G06F 16/332* (2019.01)
*G06F 16/2452* (2019.01)
*G06F 16/9032* (2019.01)
G06N 5/02 (2006.01)
G06N 7/00 (2006.01)
G06K 9/62 (2006.01)

(52) U.S. Cl.
CPC ...... *G06F 16/90332* (2019.01); *G06F 16/951* (2019.01); *G06N 20/00* (2019.01); *G06K 9/6256* (2013.01); *G06K 9/6269* (2013.01); *G06N 5/025* (2013.01); *G06N 7/005* (2013.01)

(58) Field of Classification Search
CPC ........... G06F 16/24522; G06F 16/3329; G06F 16/951; G06K 9/6256; G06K 9/6269
USPC .......................................................... 706/12
See application file for complete search history.

(56) References Cited

U.S. PATENT DOCUMENTS

| | | | |
|---|---|---|---|
| 8,442,951 | B1 | 5/2013 | Brannon et al. |
| 8,706,729 | B2 | 4/2014 | Welinder et al. |
| 9,245,009 | B2* | 1/2016 | Clark ............... G06F 17/30902 |
| 2004/0172594 | A1 | 9/2004 | Jones et al. |
| 2004/0261016 | A1 | 12/2004 | Glass et al. |
| 2006/0265351 | A1 | 11/2006 | Day et al. |
| 2009/0287678 | A1 | 11/2009 | Brown et al. |
| 2010/0179930 | A1* | 7/2010 | Teller ................... G06N 99/005 706/12 |
| 2011/0066587 | A1 | 3/2011 | Ferrucci et al. |
| 2011/0125734 | A1 | 5/2011 | Duboue et al. |
| 2012/0303894 | A1 | 11/2012 | Zwisler et al. |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |
| 2013/0151476 | A1 | 6/2013 | Brannon |
| 2013/0246315 | A1 | 9/2013 | Joshi et al. |
| 2013/0325820 | A1 | 12/2013 | Grube et al. |
| 2013/0346409 | A1 | 12/2013 | Welinder et al. |
| 2014/0074845 | A1 | 3/2014 | Dimassimo et al. |
| 2014/0321291 | A1 | 10/2014 | Chen et al. |

OTHER PUBLICATIONS

Question-Answering by Predictive Annotation—2000 Prager et al. (Year: 2000).*
Grace, Julia et al., "Artist Ranking through Analysis of Online Community Comments", International Business Machines Corporation, IBM Research Report, Computer Science, Oct. 25, 2007, 11 pages.
Prager, John et al., "Question-Answering by Predictive Annotation", ACM, SIGIR 2000, Jul. 2000, Athens, Greece, pp. 184-191.
List of IBM Patents or Patent Applications Treated as Related, Oct. 14, 2015, 2 pages.
"U-Compare User Guide", Database Center for Life Science, Japan, Apr. 2011, Accessed from the Internet Aug. 4, 2014, 8 pages.
Andrews, Bradley M. et al., "COALA: A Tool for Inter-document Conference Resolution Evaluation", American Association for Artificial Intelligence, Jul. 2006, 6 pages.
High, Rob, "The Era of Cognitive Systems: An Inside Look at IBM Watson and How it Works", IBM Corporation, Redbooks, Dec. 12, 2012, 16 pages.
IBM, "System and Method for Improving Ingestion Rate of Data Stores", www.ip.com, IP.com No. IPCOM000175631D, Oct. 16, 2008, 10 pages.
Looks, Moshe et al., "Streaming Hierarchical Clustering for Concept Mining", IEEE, Mar. 2007, 12 pages.
McCord, M.C. et al., "Deep parsing in Watson", IBM J. Res. & Dev. vol. 56 No. 3/4 Paper 3, May/Jul. 2012, pp. 3:1-3:15.
Yuan, Michael J., "Watson and healthcare, How natural language processing and semantic search could revolutionize clinical decision support", IBM developerWorks, IBM Corporation, Apr. 12, 2011, 14 pages.
Zhu, Wei-Dong et al., "IBM Content Manager OnDemand Guide", ibm.com/redbooks, Oct. 2013, 536 pages.

* cited by examiner

FIG. 7

PREDICTING AND ENHANCING DOCUMENT INGESTION TIME

BACKGROUND

The present application relates generally to an improved data processing apparatus and method and more specifically to mechanisms for predicting and enhancing document ingestion time in a question answering system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems, which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method is provided in a data processing system for predicting and enhancing ingestion time for a set of input documents. The method comprises receiving a set of documents to be added to a corpus of the data processing system. The method further comprises recording document features of each document within the set of documents using an annotation engine within the data processing system. The method further comprises predicting an ingestion time for each document within the set of documents based on the document characteristics and a machine learning model. The method further comprises assigning the set of documents to data processing system resources to be processed based on the predicted ingestion time for each document.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Currently, when adding a large set of documents to a corpus of a QA system, it is important to load balance document ingestion among QA system resources. However, it is difficult to predict how long each document will take to ingest. Without an idea of how long certain documents will take, one may unintentionally assign a majority of processing-intensive documents to the same computing node, which results in delayed completion of document ingestion.

The illustrative embodiments provide a mechanism for predicting and enhancing document ingestion time in a question answering (QA) system. The mechanism annotates each document to identify characteristics of the document being processed and the ingestion time features of the identified characteristics. In example embodiments, these characteristics include lists, tables, images, text to be processed using optical character recognition (OCR), external links that must be followed, multi-select lists, etc.

For each annotation that produces a feature type, the mechanism generates feature values based on the feature, or sub-characteristics of the feature, where values are related to processing time or ingestion performance. The mechanism builds a learning model based on these features and sub-features. The mechanism then uses the model to predict the potential ingestion time for a document with similar features. Based on the predicted ingestion time for an overall ingestion and on annotator based processing, the mechanism performs intelligent scale-out ingestion or delayed ingestion. In one embodiment, the mechanism excludes ingestion of certain features based on the predicted ingestion times.

The mechanism determines ingestion times and characteristics for documents typically assigned to a QA system corpus. The mechanism provides a list of characteristics and processing times to a machine learning component and determines which characteristics are most predictive of time-to-ingest. With accurate time-to-ingest, the mechanism can more accurately predict the overall ingestion time and more properly load balance the ingestion task among QA system resources as needed.

The mechanism also enhances document ingestion time based on the domain and how certain document features may affect a domain. For example, in Guideline or Clinical Trials Matching parsing checkboxes and criteria is very important. The system would not skip those processes; however, parsing tables may not be important, so the mechanism skips table parsing for the domain. However, for a financial domain, parsing tables would be important, so the mechanism enables table parsing, but may disable some other annotator based on feature type. Some of ingestion processing could be real-time or near real-time where the system must quickly ingest certain parts and disable or delay certain parts to provide better performance at ingestion time and in answering questions that are based on real-time feeds. Some of this can be pulled back to the description or general information section.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

Figure 1:
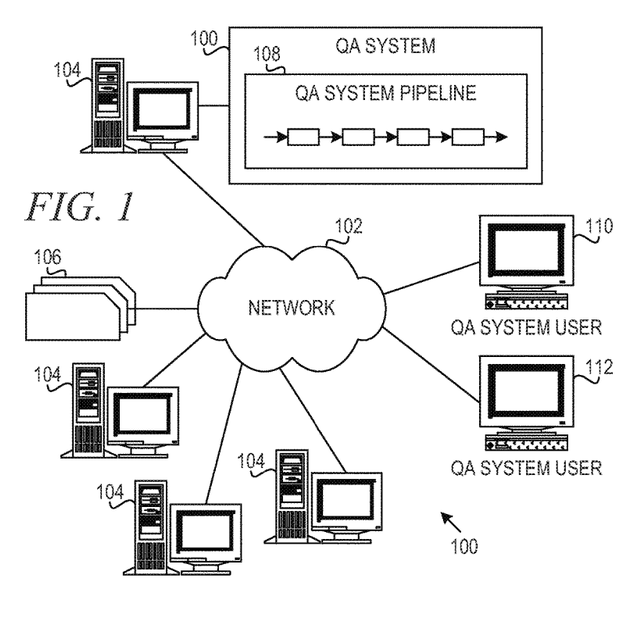
FIG. 1 depicts a schematic diagram of one illustrative embodiment of a question/answer creation (QA) system in a computer network.
Figure 2:
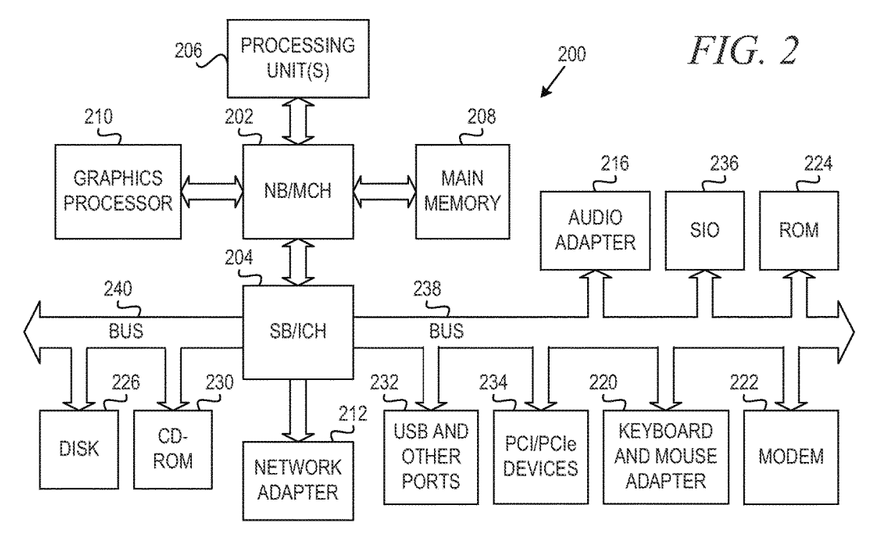
FIG. 2 is a block diagram of an example data processing system in which aspects of the illustrative embodiments may be implemented.
Figure 3:
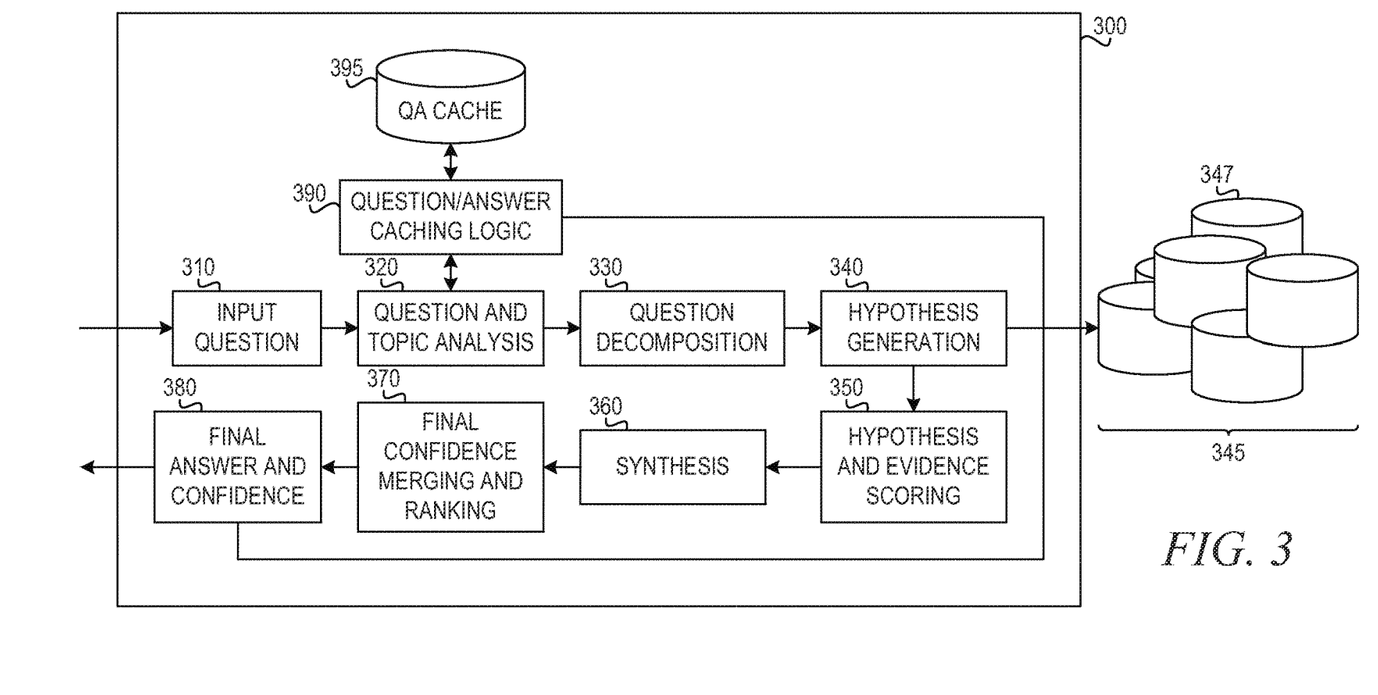
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to automatically generating testing/training questions and answers by performing pattern based analysis and natural language processing techniques on the given corpus for quick domain adaptation.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms, which evaluate the content to identify the most probable answers, i.e., candidate answers, for the input question. The illustrative embodiments leverage the work already done by the QA system to automatically generate testing/training questions and answers by performing pattern based analysis and natural language processing techniques on the given corpus for quick domain adaptation.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enable question/answer (QA) generation functionality for one or more QA system users via their respective computing devices 110, 112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 is routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 to be answered by the content in the corpus of data 106. In one embodiment, the questions are formed using natural language. The QA system 100 interprets the question and provide a response to the QA system user, e.g., QA system user 110, containing one or more answers to the question. In some embodiments, the QA system 100 provides a response to users in a ranked list of candidate answers.

The QA system 100 implements a QA system pipeline 108, which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system receives an input question, which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms look at the matching of terms and synonyms within the language of the input question and the found portions of the corpus of data. Other reasoning algorithms look at temporal or spatial features in the language, while others evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model is then used to summarize a level of confidence that the Watson™ QA system has regarding the evidence that the potential response, i.e., candidate answer, is inferred by the question. This process is repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, also referred to as annotation engines or annotators, may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

As used herein, a "domain" is a technical, professional, or academic field having a corresponding corpus or source of information. For instance, one domain is a healthcare domain where a corresponding corpus for the domain includes healthcare documents and another domain is a financial domain where a corresponding corpus for the financial domain is a collection of financial documents.

The queries are applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus are then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

In the synthesis stage 360, the many relevance scores generated by the various reasoning algorithms are synthesized into confidence scores for the various hypotheses. This process involves applying weights to the various scores, where the weights have been determined through training of the statistical model employed by the QA system and/or dynamically updated, as described hereafter. The weighted scores are processed in accordance with a statistical model generated through training of the QA system that identifies a manner by which these scores are combined to generate a confidence score or measure for the individual hypotheses or candidate answers. This confidence score or measure summarizes the level of confidence that the QA system has about the evidence that the candidate answer is inferred by the input question, i.e., that the candidate answer is the correct answer for the input question.

The resulting confidence scores or measures are processed by a final confidence merging and ranking stage 370 which compares the confidence scores and measures, compare them against predetermined thresholds, or perform any other analysis on the confidence scores to determine which hypotheses/candidate answers are the most likely to be the answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question.

After stage 380, or as part of stage 380, the set of candidate answers is output via a graphical user interface, which provides the user with tools for collaborating with the QA system to review, evaluate, and modify the listing of candidate answers and the evidence associated with these candidate answers that is evaluated by the QA system. That is, at stage 390, the graphical user interface engine not only receives the final ranked listing of candidate answers generated by the QA system pipeline 300, but also receives the underlying evidence information for each of the candidate answers from the hypothesis and evidence scoring stage 350, and uses this information to generate a graphical user interface outputting the ranked listing of candidate answers and an output of the selected portions of the corpus of data/information that supports, and/or detracts, from the candidate answers being the correct answer for the input question, referred to hereafter as the "evidence passages." Stage 390 may also cache candidate answers and evidence in QA cache 395 to more quickly provide answers and supporting evidence for recently or frequently asked questions.

Figure 4:
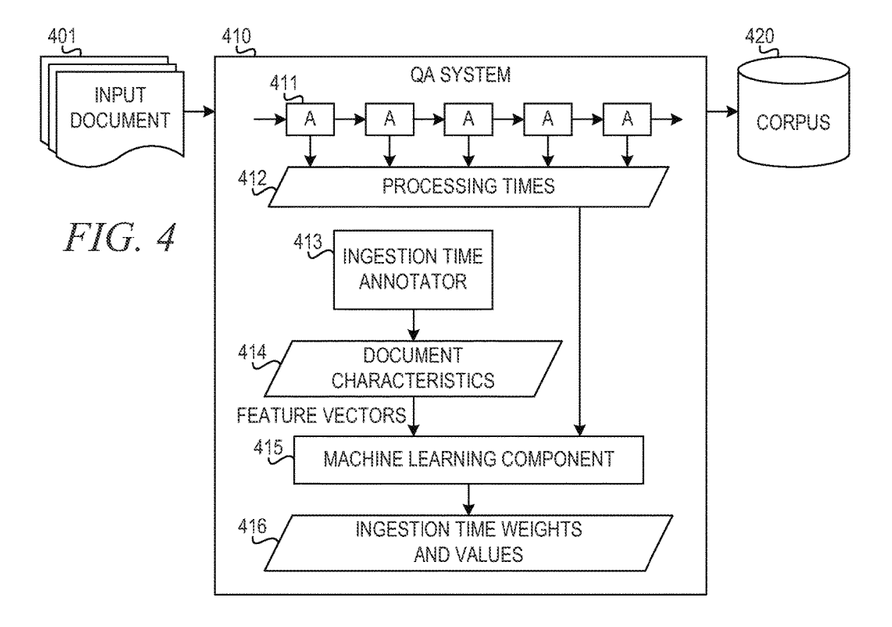
FIG. 4 is a block diagram of a question answering system with machine learning of document ingestion time in accordance with an illustrative embodiment.

FIG. 4 is a block diagram of a question answering system with machine learning of document ingestion time in accordance with an illustrative embodiment. Question answering (QA) system 410 receives a set of input documents 401 to be added to corpus 420. Input documents 401 may be a set of training documents or a set of documents to be added to corpus 420 for a particular domain or application. QA system 410 includes annotators 411, also referred to as software engines or annotation engines, each of which process an input document for one or more particular features. For example, one annotator 411 may identify and mark and/or process images in a document, while another may mark text with parts of speech. For ingestion of documents, annotators 411 process and annotate input documents 401 for entry into corpus 420.

Each annotator 411 involves an amount of processing time 412 for an input document. QA system 410 records the processing times 412 for later processing or analysis. In one example embodiment, QA system 410 records processing times and other resource usage statistics in managed beans (MBeans), which are a type of JavaBean, created with dependency injection. MBeans are particularly used in the Java Management Extensions technology, but with Java EE 6, the specification provides for a more detailed meaning of a managed bean. An MBean represents a resource running in the Java™ virtual machine. MBeans can be used for collecting statistics on concerns like performance, resources usage, or problems (pull); for getting and setting application configurations or properties (push/pull); and notifying events like faults or state changes (push). Other techniques for recording processing times and resource usage may be used depending upon the implementation.

In accordance with the illustrative embodiment, ingestion time annotator 413 records document characteristics 414 including numbers and types of document features. In example embodiments, document characteristics 414 include number of document features (e.g., lists, tables, images, OCR, external links to be followed, etc.), types and subtypes of document features (e.g., for lists, checkbox, multi-select, simple select, etc.), size of each document feature (e.g., for a table, number of rows and columns), analysis method of document feature (e.g., Multiple Traversal Analysis, Check Box Analysis, Multi-Select Analysis, Table Insight Analysis, Criteria Analysis), overall size of document (e.g., bytes), and/or other characteristics that might affect ingestion time (e.g., Flesch-Kincaid Reading Level). Each analysis method requires specialized algorithms and techniques, which vary based on the type, size, and sub-characteristics. For example, the CheckBox Analysis method may include identifying the X marker, then parsing the text following the X, then traversing back to the first statement without an indentation to identify the category, annotating and delineating the document during ingestion.

Ingestion time annotator 413 is intended to run quickly so that the cost of running ingestion time annotator 413 is smaller than the benefit of an accurate prediction. That is, the time and processing cost to run ingestion time annotator 413 must be smaller than the time and processing cost saved with more effective load balancing. In one example embodiment, ingestion time annotator 413 is actually a sub-pipeline of annotators that perform individual processing functions, such as parsing, word counting, feature identification, etc.

As QA system 410 ingests input documents 401, Machine learning component 415 receives document characteristics 414 in the form of feature vectors for each input document per document characteristic and sub-characteristic. Machine learning component 415 also receives processing times 412, which include ingestion times for individual features, or sub-characteristics of features. Machine learning component 415 then identifies the degree to which features or sub-characteristics contribute to ingestion time and generates values and weights 416 to be used for predicting ingestion time.

In one illustrative embodiment, machine learning component 415 continuously adjusts ingestion time values and weights as input documents 401 are added to corpus 420. As more and more input documents are added to the corpus, QA system may encounter documents with very different features. For example, QA system 410 may receive a set of input documents with unusually large tables, a large number of multi-select lists, or many images with text to be recognized. Thus, machine learning component 415 updates and improves ingestion time weights and values 416 as these situations are encountered. As another example, one may reconfigure QA system 410 to use different combinations of annotators 411 to ingest input documents based on which features contribute more to more accurate answers with high confidence. Machine learning component 415 also adjusts ingestion time weights and values 416 based on which annotators 411 are being used.

Figure 5:
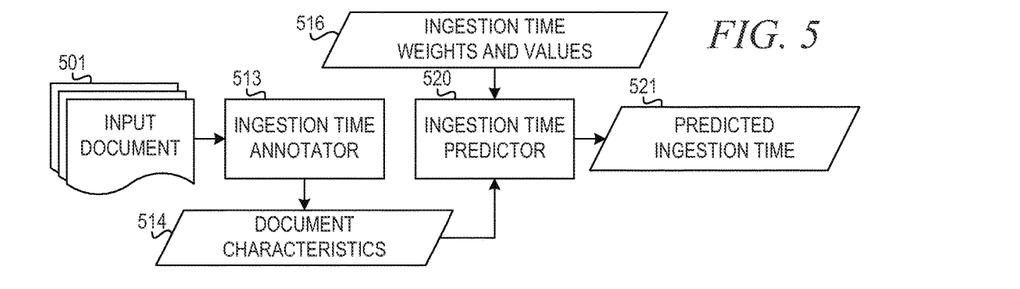
FIG. 5 is a block diagram of a mechanism for predicting document ingestion time in accordance with an illustrative embodiment.

FIG. 5 is a block diagram of a mechanism for predicting document ingestion time in accordance with an illustrative embodiment. The mechanism may be embodied within a QA system, such as QA system 410 in FIG. 4, or within a data processing system such as data processing system 200 in FIG. 2. Ingestion time annotator 513 may be the same software component as ingestion time annotator 413 or a different instance of ingestion time annotator 413. Ingestion time annotator 513 receives input documents 501 to be added to a corpus of a QA system.

Ingestion time annotator 513 records document characteristics 514 for an input document 501, including numbers and types of document features. In example embodiments, document characteristics 514 include number of document features (e.g., lists, tables, images, OCR, external links to be followed, etc.), types and subtypes of document features (e.g., for lists, checkbox, multi-select, simple select, etc.), size of each document feature (e.g., for a table, number of rows and columns), analysis method of document feature (e.g., multiple traversal), overall size of document (e.g., bytes), and/or other characteristics that might affect ingestion time (e.g., Flesch-Kincaid Reading Level).

Ingestion time predictor 520 receives document characteristics 514 and characteristic weights 516. Ingestion time predictor 520 uses the model defined by ingestion time weights and values 516 to determine predicted ingestion time 521 for each input document 501. The mechanism may sum up the predicted ingestion times 521 for the set of input documents 501 to help schedule an ingestion job. In one embodiment, the QA system uses predicted ingestion times 521 for load balancing when assigning input documents 501 to processing nodes. Also, in one example embodiment, the QA system excludes ingestion for certain features in at least a first phase of ingestion processing based on predicted ingestion times 521.

There are multiple analysis methods depending on the document type and characteristics. These are annotators implemented in such a way to handle these distinct characteristics of the documents such that semantic meaning and correlation can be retrieved from the document and annotated for use by the Q & A system. For example, developing insightful statements from a table during ingestion time requires parsing the table, designating the columns and rows and performing statistical analysis then generating insightful annotations for the table. This is done for all tables by the Table Insight Analyzer annotator, which vary based on size, dimension and the enabled insight types for the document domain. The processing time for this can be learned based on the features present and used to predict. Further analysis methods will come about as document ingestion characteristics and algorithms are brought forth but not limited to the set mentioned above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
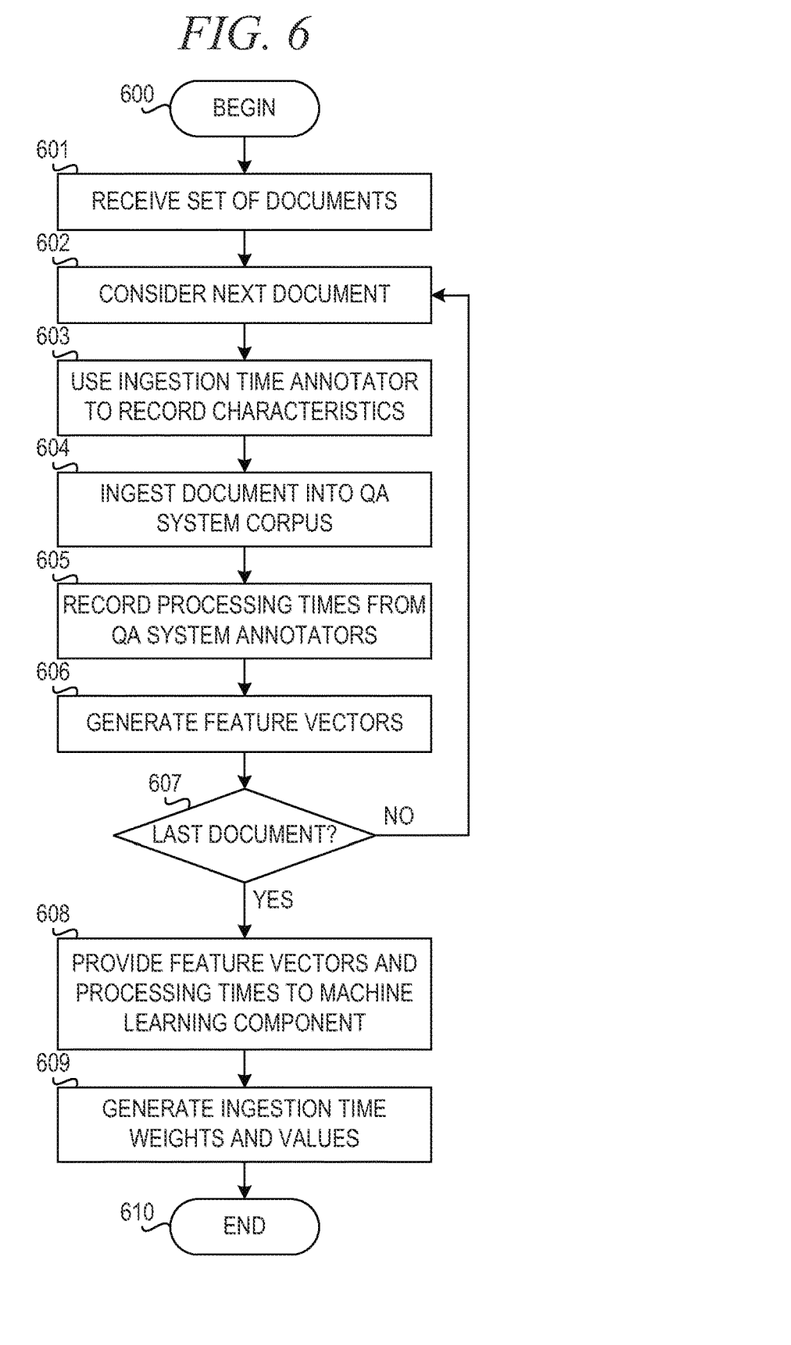
FIG. 6 is a flowchart illustrating operation of a question answering system with machine learning of document ingestion time in accordance with an illustrative embodiment.

FIG. 6 is a flowchart illustrating operation of a question answering system with machine learning of document ingestion time in accordance with an illustrative embodiment. Operation begins (block 600), and the question answering (QA) system receives a set of input documents (block 601). The set of input documents may be a set of training documents or a set of documents to be added to the QA system corpus for a particular domain or application.

The QA system considers the next document (block 602) and uses an ingestion time annotator to record characteristics of the document (block 603). The QA system then ingests the document into the QA system corpus (block 604) and records processing times from the QA system annotators (block 605). The QA system generates feature vectors for the features of the document (block 606).

The QA system determines whether the document being considered is the last document in the set (block 607). If the document is not the last document, operation returns to block 602 to consider the next document.

If the document being considered is the last document in the set in block 607, then the QA system provides the feature vectors and processing times to a machine learning component (block 608). The machine learning component generates ingestion time weights and values based on the features of the input documents and the processing times of the particular annotators in the QA systems for ingesting the documents (block 609). Thereafter, operation ends (block 610). The operation of the flowchart in FIG. 6 may be run initially for a set of training documents and then repeated for each set of documents being ingested into the QA system corpus.

Figure 7:
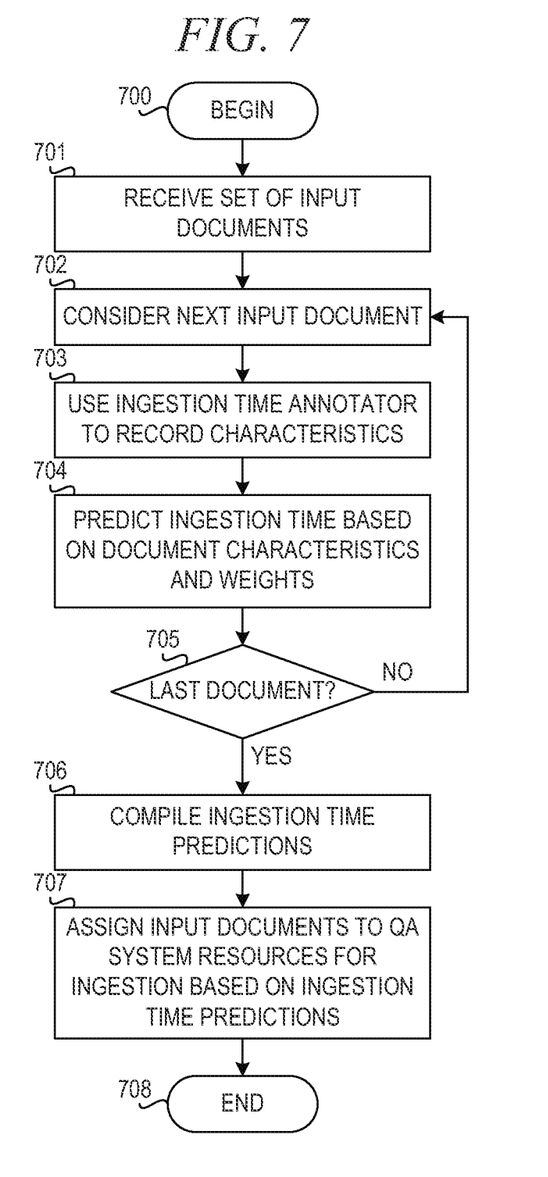
FIG. 7 is a flowchart illustrating operation of a mechanism for predicting document ingestion time in accordance with an illustrative embodiment.

FIG. 7 is a flowchart illustrating operation of a mechanism for predicting document ingestion time in accordance with an illustrative embodiment. Operation begins (block 700), and the mechanism receives a set of input documents to be added to a QA system corpus (block 701). The mechanism considers the next input document (block 702) and uses an ingestion time annotator to record characteristics of the document (block 703). The mechanism predicts ingestion time for the document based on the document characteristics and ingestion time values and weights from the machine learning model (block 704).

The mechanism determines whether the document being considered is the last document in the set of input documents (block 705). If the document is not the last document, operation returns to block 702 to consider the next document.

If the document being considered is the last document in the set of input documents in block 705, the mechanism compiles the ingestion time predictions (block 706). The mechanism then assigns input documents to QA system resources for ingestion into a QA system corpus of documents based on the ingestion time predictions (block 707). Thereafter, operation ends (block 708).

The mechanism also enhances document ingestion time based on the domain and how certain document features may affect a domain. For example, in Guideline or Clinical Trials Matching parsing checkboxes and criteria is very important. When assigning QA system resources for ingestion, the system would not skip those processes; however, parsing tables may not be important, so the mechanism skips table parsing for the domain. However, for a financial domain, parsing tables would be important, so the mechanism enables table parsing, but may disable some other annotator based on feature type. Some of ingestion processing could be real-time or near real-time where the system must quickly ingest certain parts and disable or delay certain parts to provide better performance at ingestion time and in answering questions that are based on real-time feeds. Some of this can be pulled back to the description or general information section.

As an example configuration, for an annotator that parses document links that must be followed, the mechanism may delay, spawn off, or totally disable these annotators. The mechanism may delay, spawn off, or disable a Table Analyzer annotator, for example.

Thus, the illustrative embodiments provide a mechanism for quickly predicting the amount of time it will take to ingest a set of input documents into a question answering (QA) system corpus. The ingestion time predictions allow an administrator to more intelligently assign input documents to QA system resources for load balancing and efficient scheduling of document ingestion jobs. The mechanism uses a machine learning component that adapts the machine learning model to changing characteristics of documents and annotators used in the QA system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for predicting and enhancing ingestion time for a set of input documents, the method comprising:
   receiving a set of documents to be added to a corpus of documents;
   recording document characteristics of each document within the set of documents using a characteristic recording annotator executing within the data processing system;
   predicting an ingestion time for each document within the set of documents based on the document characteristics and a machine learning model, wherein the ingestion time is a predicted time to ingest each given document by a plurality of annotators executing within the computing device;
   determining, for a given document, a document characteristic, wherein the document characteristic corresponds to a corresponding annotator used to process the document characteristic during ingestion; and
   assigning the set of documents to question answering system resources to be processed based on the predicted ingestion time for each document, wherein assigning the set of documents to the question answering system resources comprises disabling or delaying execution of the corresponding annotator during ingestion of the given document.

2. The method of claim 1, wherein recording the document features comprises recording at least one of:
   number of document features;
   types and subtypes of document features;
   a size of each document feature;

analysis method of each document feature; or overall size of the input document.

3. The method of claim 1, wherein recording the document features comprises identifying document features from the set consisting of:
  lists;
  tables;
  images;
  text; or
  external links to be followed.

4. The method of claim 3, wherein a given document within the set of documents includes a list and wherein recording the document features comprises recording for the given document at least one of:
  a number of items in the list;
  a type of the list; or
  a subtype of at least one sublist within the list.

5. The method of claim 3, wherein a given document within the set of documents includes a table and wherein recording the document features comprises recording for the given document at least one of:
  a number of rows in the table; or
  a number of columns in the table.

6. The method of claim 3, wherein a given input document within the set of input documents includes an image and wherein recording the document features comprises recording for the given input document a size of the image.

7. The method of claim 3, wherein a given document within the set of documents includes a portion of text and wherein recording the document features comprises recording for the given document at least one of:
  a length of the portion of text; or
  a Flesch-Kincaid Reading Level of the portion of text.

8. The method in claim 1, wherein the question answering system disables or delays execution of the corresponding annotator to process the given document based on at least one of:
  annotator processing configuration;
  document characteristic impact on question types for a domain associated with the corpus; or
  time required to process the given document by the corresponding annotator.

9. The method in claim 1, wherein the data processing system determines, for a given document, a document characteristic and processes only a segment of data within the given document using the corresponding annotator.

10. The method of claim 1, wherein the machine learning model comprises ingestion time values and weights for each feature and sub-feature.

11. The method of claim 1, further comprising:
  receiving a set of input documents;
  recording document characteristics of each input document within the set of input documents using the annotation engine;
  ingesting each input document within the set of input documents using a pipeline of annotation engines within the data processing system, wherein each annotation engine within the pipeline of annotation engines processes a portion of the input document for a respective document feature;
  recording a processing time of each annotation engine within the pipeline of annotation engines; and
  generating the machine learning model based on the recorded document characteristics and the recorded processing times.

12. The method of claim 11, wherein generating the machine learning model comprises determining a weight for each document characteristic, wherein the weight represents a degree to which the characteristic contributes to ingestion time.

* * * * *